June 4, 1963 T. D. ROSSING ET AL 3,092,812

NON-DESTRUCTIVE SENSING OF THIN FILM MAGNETIC CORES

Filed May 10, 1957

INVENTORS
THOMAS D. ROSSING
ARTHUR V. POHM
SIDNEY M. RUBENS
BY
Cushman, Darby & Cushman
ATTORNEYS 3,092,812

NON-DESTRUCTIVE SENSING OF THIN FILM MAGNETIC CORES

Thomas D. Rossing, St. Paul, Arthur V. Pohm, White Bear Lake, and Sidney M. Rubens, St. Paul, Minn., assignors to Sperry Rand Corporation, New York, N.Y., a corporation of Delaware Filed May 10, 1957, Ser. No. 658,258
41 Claims. (Cl. 340—174)

This invention relates to magnetic memory devices such as magnetic cores with rectangular hysteresis loops, and particularly to apparatus for non-destructively sensing the magnetic state of such cores when in the form of thin films exhibiting single domain properties.

The formation of thin film magnetic cores may be accomplished by condensing certain magnetic alloys in the presence of the magnetic field. The process referred to is fully described and claimed in the copending Sidney M. Rubens application Serial No. 599,100, filed July 20, 1956, now Patent No. 2,900,282. As expressed therein, the resultant ferromagnetic films have extremely rectangular hysteresis loops measured along an axis which may be termed an easy axis of magnetization. This axis is in a direction parallel to the magnetic field applied during the deposition process. Such films when made sufficiently thin, tend to be a single magnetic domain in extent, although they may contain several small domains of reverse magnetization in association with lattice imperfections and inclusions. Films of the above description may be said to have single domain properties.

In accordance with this invention, it has been found that the magnetic state of films made in accordance with said application may be non-destructively sensed by momentarily providing a field in a direction transverse to the easy axis of the film along which the remanent magnetization lies. This invention provides apparatus for inducing such a transverse field in a magnetic film. It is to be understood that thin magnetic films and the non-destructive sensing means provided by this invention may be used singularly as a magnetic gate, switch, amplifier, or the like. Additionally, a plurality of such films and the associated non-destructive sensing apparatus may be employed in flip-flop circuits, matrices, and other plural magnetic core circuits wherein it is desirable to increase the operating speeds and reliability of electronic digital apparatus, especially that embodied in computing machinery.

Therefore, the primary object of this invention is the provision of apparatus for sensing the state of a thin magnetic memory film non-destructively.

Another object of this invention in conjunction with the preceding object is the provision of apparatus for inducing flux in a magnetic film in a direction transverse to the remanent magnetization axis thereof for non-destructively sensing the state of the film.

Another object of this invention is the provision of a flat conductor disposed adjacent a magnetic film for momentarily carrying current to cause a non-destructive sensing field to be induced in the film.

Another object of this invention is the provision of non-destructive sensing apparatus in a magnetic memory matrix comprised of a plurality of thin magnetic films.

Still another object of this invention is the provision in a magnetic memory matrix system of only two windings which provide both non-destructive readout and magnetic switching of the thin film magnetic cores used therein.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Two basic theories have been developed to explain the remagnetization or switching process in magnetic cores. In the one, remagnetization takes place by a rotation of the magnetic vector from one remanent state to the other. Experiments have shown that this process predominates under certain conditions in vacuum-deposited films of magnetic material which are so thin that they exhibit single domain properties. Films of this nature may be produced in the manner taught in said Rubens application Serial No. 599,100, now Patent No. 2,900,282.

The other theory shows remagnetization taking place by the movement of 180° domain walls. When a magnetic specimen with a nearly rectangular hysteresis loop is in one of its remanent states, a few domains of reverse magnetization apparently exist since $B_s$, the magnetic induction at saturation, is greater than $B_r$, the remanent value. When a magnetic field is applied in the reverse direction, additional reverse domains nucleate principally at grain boundaries, inclusions, and lattice imperfections. These reverse domains then grow at the expense of oppositely oriented domains. When they encompass the entire core, it is said to be switched. All references to magnetic cores herein refer to thin film cores, such as the type produced in accordance with said Rubens application, and not to thicker cores which switch or remagnetize in accordance with the wall movement process.

Figure 1:
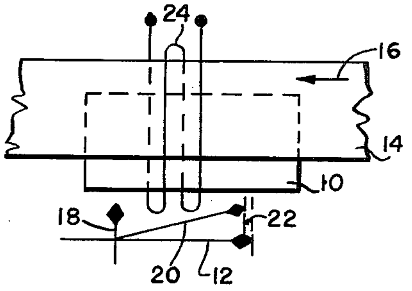
FIGURE 1 illustrates one embodiment of this invention.

In FIGURE 1 the thin film of magnetic material 10 has an easy axis of magnetization which for illustrative and description purposes will be arbitrarily designated to be in the lengthwise direction of the film. It is to be understood, however, that the film 10 need not be rectangular, but may be square, circular, or of any other configuration. The film has a rectangular hysteresis loop characteristic and its remanent magnetization lies along the easy axis of magnetization in one direction or the other. Vector 12 indicates the remanent magnetization in a given direction. To cause a field transverse to the remanent magnetization, current is alowed to flow through the conductor or current sheet 14 in a direction parallel to the easy axis of magnetization of the magnetic film 10. When current flows in conductor 14 in the direction shown by arrow 16, a transverse magnetic field is produced in the direction shown by flux vector 18. Since the current sheet or conductor 14 lies adjacent and substantially parallel to the magnetic film 10, the transverse flux caused by current flowing in the conductor 14 will link the magnetic film 10. The current in conductor 14 preferably has short rise and fall times; it can exist for any arbitrary length of time but is preferably of momentary duration. This current causes the remanent magnetization of film 10 to rotate away from the easy direction of magnetization, theoretically, in the absence of a magnetic field preventing such rotation. No matter how long current flows in conductor 14, film 10 will never reverse its magnetic state. During the flow of the current in conductor 14 the remanent magnetization vector 12 rotates, for example, as illustrated by vector 20. In effect, the remanent magnetization along the easy axis of magnetization will have been reduced an amount equal to vector 22. It is this reduction in the remanent magnetization that induces an E.M.F. in the sense winding 24. It will be recognized, that if the remanent magnetization were in a direction opposite to that of vector 12, the reduction thereof upon application of transverse flux 18 would be in a direction opposite to that shown by vector 22. The polarity of the voltage induced in sense winding 24 indicates the direction of remanent magnetization in the magetic film 10. Even though the change in remanent magnetization is small when the film is thus sensed, the voltage output from the sense winding 24 might be quite large since the voltage induced therein is proportional to the time rate of change of the remanent magnetization rather than the amount thereof.

During recession of the current through conductor 14, the remanent magnetization vector 20 rotates back into alignment with the easy axis of magnetization and again becomes vector 12. Thus, it is apparent that the conductor 14 current, which may be termed an "interrogating current," produces a signal in sense winding 24 without destroying the state of remanent magnetization of magnetic film 10.

As to the apparatus illustrated in FIGURE 1, it is to be understood that the conductor or current sheet 14 may cover the whole area of the magnetic film 10, although it need not do so. Additionally, it should be understood that the current sheet 14 may or may not touch the film 10, and that the sheet 14 need not be exactly parallel to the film. In fact, the current conductor need only be of such size, and need only to cover as much of the film, and need be disposed relative to the film as is necessary to be in an area of magnetic influence as to the film to provide therefor the essential transverse field. In addition, it is to be understood that the sense winding 24 may be coiled only about the magnetic film itself, rather than about both the film and the current sheet 14, since it is the change of remanent magnetization in the film that induces the resultant voltage in the sense winding.

Figure 2:
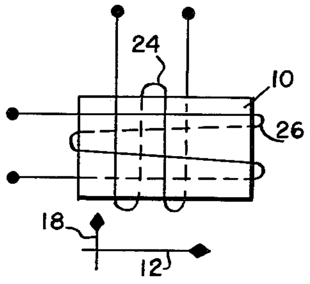
FIGURE 2 illustrates a second embodiment of this invention.

Instead of the conductor 14 being in the form of a current sheet as shown in FIGURE 1, it may be in the form of a coiled winding 26 as shown in FIGURE 2. It will be noted that the winding 26 is coiled about the magnetic film 10 in a direction substantially parallel to the remanent magnetization of the film. In this manner, a transverse flux indicated by vector 18 will again cause reduction of the remanent magnetization so that a signal will be induced in the sense winding 24. The operation of the apparatus is similar to that described for the non-destructive system in FIGURE 1.

Figure 3:
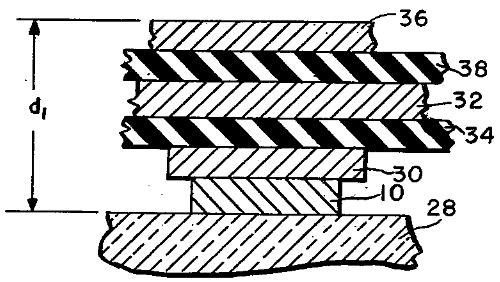
FIGURE 3 illustrates another embodiment of this invention wherein the non-destructive sensing apparatus is laminated or plied with the thin magnetic film.

A still further embodiment of the invention is illustrated in FIGURE 3 wherein the thin magnetic film 10 of single domain properties is shown resting on a substrate 28. In accordance with the said Rubens application Serial No. 599,100, thin magnetic films are normally condensed on a smooth surface substrate, for example glass, no limitation thereto being intended. Disposed immediately above the magnetic film 10 is a conductor 30 which may form a current sheet such as conductor 14 of FIGURE 1. In FIGURE 3, however, conductor 30 is shown as fully covering the area of the magnetic film 10, thereby ensuring a uniform field in the film. It will be noted that no space or insulative material is present between film 10 and conductor 30 since it is immaterial whether the current in conductor 30 passes also through the magnetic film 10. However, the invention is not limited to a contiguous relationship between conductor 30 and film 10. A sensing or output winding for the laminated or plied unit of FIGURE 3 may take the form of a second conductor 32. This sensing conductor 32 is preferably a flat current sheet similar to conductor 14 of FIGURE 1 and extends substantially parallel to film 10 and perpendicular to conductor 30. Conductors 30 and 32 may be separated by a layer of insulation 34, or alternatively, one or the other may be disposed on the opposite side of the magnetic film 10, i.e., below substrate 28. When the conductors 30 and 32 are disposed on the same side of the magnetic film 10, it may be desirable to use a high permeability "backing" material 36, such as Hypersil, above the upper conductors 30 and 32 to complete the flux path of magnetic film 10 and thereby reduce the free pole effect therein. To electrically isolate the high permeability material 36 from the upper of the conductors 30 and 32, a layer of insulation 38 may be inserted therebetween. The insulating sheet or layers 34 and 38 may also serve as bonding material. Additionally, instead of having separate insulation layers and conductors, the conductors 30 and 32 may be effectively an integral part of the insulation layers 34 and 38 formed in any conventional printed circuit manner. No limitation is intended either way, and the term "printed circuit," is intended to include all conducting arrays fabricated by methods such as etching, evaporating, painting, etc., which are well known in the art. After complete assembly of the unit shown in FIGURE 3, the distance $d_1$ is preferably 5 mils or less, although the distance may be less or even greater as long as the high permeability backing material 36, the conductors 30 and 32 and film 10 are all in the same area of magnetic influence.

As a laminated or plied unit, the apparatus of FIGURE 3 may operate in the same manner as that described for the apparatus of FIGURE 1. That is, when interrogating current is momentarily present in the transverse current carrying conductor 30, the remanent magnetization of the magnetic film 10 changes in amount along the easy axis of magnetization thereof so that a signal is induced in the sense winding or conductor 32. Upon cessation of the interrogating current in the transverse conductor 30, the signal in the output winding ceases and the remanent magnetization of film 10 returns to its pre-existing state without any reversal or destruction thereof. Thus, it is unnecessary to provide apparatus to rewrite or remagnetize the magnetic film 10 to re-effect the pre-existing state thereof. However, if it is desired to reverse the magnetic state of film 10, the conductor 32 alone, or both conductors 30 and 32 may be connected to carry current in the appropriate direction continuously so as to switch the film 10 to its opposite state of magnetization. That is, magnetic film 10 may be switched by a current in conductor 32 alone since such current will cause a flux in film 10 in a direction parallel with the easy axis of magnetization of the film. Also, the film may be switched faster, than by current in conductor 32 alone, by simultaneously providing current in conductor 30 to cause a transverse field in film 10. In this case, the current producing the transverse field is maintained along with the current in conductor 32 until the film is at least substantially fully switched. One aspect of such switching of magnetic cores including thin films by the aid of a transverse field is fully described and claimed in the copending application of Rubens et al., Serial No. 626,945, filed December 7, 1956, now Patent No. 3,030,612.

As indicated above, the apparatus in FIGURE 3 may comprise a unit for a circuit employing a single magnetic core device such as gates, amplifiers, switches and the like. Alternatively, FIGURE 3 may be representative of one unit of a plurality thereof as may be used in flip-flop circuits, magnetic memory arrays or matrices, and the like. When the apparatus of FIGURE 3 is part of a memory matrix system, such system may take the form shown at least partially in FIGURE 4.

Figure 4:
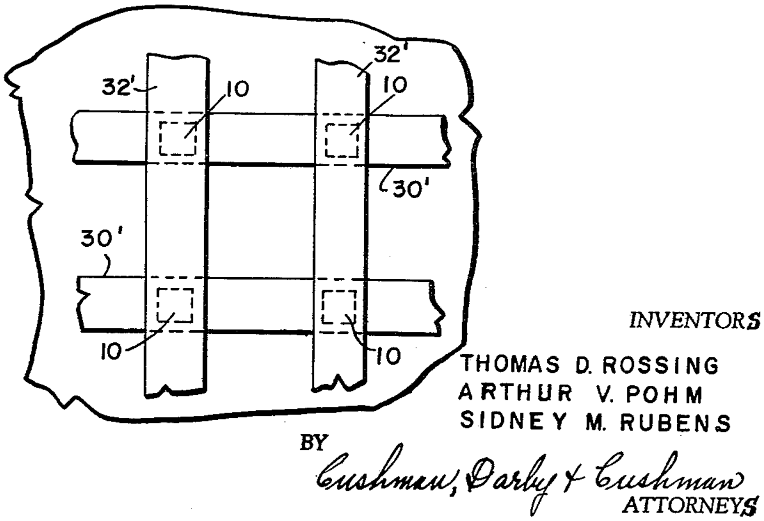
FIGURE 4 is a plan view of four magnetic memory units arranged as part of a two-dimensional memory matrix.

FIGURE 4 illustrates a plurality of magnetic films 10 shown in dotted lines since they are beneath the transverse conductors 30' and the sensing current sheet type conductors 32'. As illustrated, the magnetic films are arranged in rows and columns, with the associated transverse and sensing conductors being disposed thereover in such a manner that the conductors are substantially perpendicular to each other. The insulation layers (not shown) such as layers 34 and 38 of FIGURE 3, may be an insulative sheet covering the whole area of the matrix, or alternatively, may be individual layers of insulation disposed above each magnetic film 10. As above mentioned, the conductors and insulation may also be printed circuits.

As in any magnetic core matrix system, energization of a conductor along a row or column of cores will cause the cores along a column of cores to be magnetically influenced. Associating each core with a binary digit of a register, for example, the binary registration of such core may be sensed without destruction of such registration. The phase of the E.M.F. induced in each sensing conductor may indicate the polarity of the remanent magnetization associated with the cores being interrogated.

As above indicated, the sets of conductors 30′ and 32′ may be employed not only for non-destructive sensing purposes, but for reversing the magnetization state of any particular core or cores, with the transverse switching field being supplied by current through the chosen conductor 30′.

Thus it is apparent that there is provided by this invention systems in which the various phases, objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Magnetic core non-destructive sensing apparatus comprising a film of rectangular hysteresis loop type magnetic material exhibiting single domain properties and having remanent magnetization along a single easy magnetization axis lying in the plane of the film, a conductor in inductive relationship with said film for carrying interrogating current to cause flux to be induced in said film in a direction transverse to said axis, and means for sensing a change in said remanent magnetization due to said flux, the arrangement being such that said interrogating current when applied at least temporarily changes the amount of remanent magnetization along said axis to provide an indication of the existence of said remanent magnetization without destruction or reversal thereof.

2. Apparatus as in claim 1 wherein said film and conductor are substantially parallel in an overlying relationship to each other.

3. Apparatus as in claim 2 wherein said film and conductor are flat.

4. Apparatus as in claim 2 wherein said conductor at least substantially covers the area of said film and is substantially contiguous therewith.

5. Non-destructive sensing apparatus for a matrix of magnetic cores comprising a plurality of films of rectangular hysteresis loop type magnetic material each exhibiting single domain properties and having remanent magnetization along a single easy magnetization axis lying in the plane of the film, said plurality of films being arranged in rows and columns, each row and each column having a number of said films, a first set of conductors one for each of said rows for carrying interrogating current to cause flux to be induced in the associated films in a direction transverse to said axis, a second set of conductors associated in inductive relationship respectively with said columns of films for sensing a change in the remanent magnetization of said films during the presence of an interrogating current, the arrangement being such that said interrogating current when applied to any one of said first set of conductors changes the amount of remanent magnetization along said axis for each of the films associated with the first conductor so energized to provide an indication of the existence of the remanent magnetization without destruction or reversal thereof.

6. Apparatus as in claim 5 wherein the films and first and second sets of conductors are substantially parallel overlyingly to each other.

7. Apparatus as in claim 6 wherein said films and conductors are substantially flat.

8. Apparatus as in claim 7 wherein the conductors of said first set are substantially contiguous with the rows of magnetic films respectively.

9. Apparatus as in claim 7 wherein the sets of conductors are disposed on the same side of said films, and further including insulation between said conductors at least in the area of said films.

10. Magnetic core sensing apparatus comprising a magnetic film capable of exhibiting single domain properties and an easy magnetization axis in the plane of the film along which any substantial remanent magnetization of the film may lie in substantially one direction or the other to represent two different stable magnetic states, a sheet conductor in inductive relationship with, and covering one face of, said film for applying an interrogating field uniformly to the whole of said film at a substantial angle to said axis without causing the film to change from its instant state to a non-instant one of the said two states, and means for sensing any change in the remanent magnetization of said film due to at least said field.

11. Apparatus as in claim 10 wherein said conductor is oriented to cause said field to be applied substantially perpendicular to said axis.

12. Apparatus as in claim 10 wherein said sense means includes a second conductor which is oriented at an angle relative to the first mentioned conductor.

13. Apparatus as in claim 11 wherein said conductors are substantially perpendicular to each other.

14. Magnetic core non-destructive sensing apparatus comprising a film having a single easy axis in its plane and at least two stable magnetic states represented by any substantial remanent magnetization of the film being in one direction or the other substantially along said easy axis, a sheet conductor in inductive relationship with, and covering one face of, said film for applying an interrogating field uniformly to the whole of said film in a direction transverse to said axis without destroying the instant stable state of the film, and means including a second conductor angulated with respect to the first mentioned conductor for sensing any change in the remanent magnetization due to at least said field.

15. Apparatus as in claim 5 including a layer of magnetic material for each of said films disposed so that all of said conductors lie between a respective film and layer and in the magnetic influence of a respective film to provide therefor a lower-than-air reluctance return flux path.

16. Apparatus as in claim 5 wherein for each of said films, at least the respective one of said first sets of conductors has outer dimensions which are at least as large as the respective dimensions of the respective film to cause the flux induced in that film by interrogating current in a first conductor to be uniform throughout that film.

17. Magnetic core sensing apparatus comprising a magnetic film capable of exhibiting single domain properties and an easy magnetization axis in the plane of the film along which any susbtantial remanent magnetization of the film may lie in substantially one direction or the other to represent two different stable magnetic states, a conductor in inductive relationship with said film for applying an interrogating field to said film at a substantial angle to said axis without causing the film to change from its instant state to a non-instant one of the said two states, means for sensing any change in the remanent magnetization of said film due to at least said field, and a piece of magnetic material in the magnetic influence of said film to provide a lower-than-air reluctance return flux path for said film.

18. Magnetic core non-destructive sensing apparatus comprising a film having a single easy axis in its plane and at least two stable magnetic states represented by any substantial remanent magnetization of the film being in one direction or the other substantially along said easy axis, a conductor in inductive relationship with said film for applying an interrogating field to said film in a direction transverse to said axis without destroying the instant stable state of the film, means including a second conductor angulated with respect to the first mentioned conductor for sensing any change in the remanent magnetization due to at least said field, and a piece of magnetic material lying susbtantially parallel to said film in the magnetic influence thereof.

19. A new use for a magnetic film capable of exhibiting single domain properties and having in its plane an easy magnetization axis along which any substantial remanent magnetization of the film may lie in substantially one direction or the other to represent two different stable magnetic states, including sensing the instant state of said film by: applying an interrogating field to said film at a substantial angle to said axis without causing the film to change from its instant state to a non-instant one of said two stable states, and sensing any change in the remanent magnetization due at least to said field.

20. A new use for a magnetic film capable of exhibiting a single easy axis in its plane and at least two stable magnetic states respectively represented by any substantial remanent magnetization of the film being in one direction or the other substantially along said easy axis, including non-destructively sensing the instant stable state of the film by: applying an interrogating field in a direction transverse to said axis without destroying the instant stable state of the film, and sensing any change in the remanent magnetization due to at least said field.

21. Magnetic core non-destructive sensing apparatus comprising: a flat film of a rectangular hysteresis loop type magnetic material exhibiting single domain properties and having remanent magnetization along a given axis; a first flat conductor in inductive relationship with said film for carrying interrogating current to cause flux to be induced in said film in a direction transverse to said axis; a second flat conductor in inductive relationship with said film for sensing a change in said remanent magnetization due to said flux; the planes of said film and said first and second conductors being substantially parallel; at least said first conductor in the area of said film at least substantially covering the area of said film; said first and second conductors having a lengthwise dimension and being oriented substantially perpendicular to each other in an overlying relationship with said film; a flat layer of magnetic material, the plane of which is substantially parallel to the plane of said film in an overlying relationship with said film so as to provide a low reluctance path for the external magnetic field of said film; insulative layers insulating said layer of magnetic material and said first and second conductors from each other; the arrangement being such that said interrogating current when applied at least temporarily changes the amount of remanent magnetization along said axis to provide an indication of the existence of said remanent magnetization without destruction or removal thereof.

22. Non-destructive sensing apparatus of a matrix of magnetic cores comprising a plurality of flat films of rectangular hysteresis loop type magnetic material each exhibiting single domain properties and having remanent magnetization along a given axis, said plurality of films being arranged in rows and columns, each row and each column havng a plurality of said films; a first set of flat conductors, one conductor for each of said rows, for carrying interrogating current to cause flux to be induced in the associated films in a direction transverse to said axis; a second set of flat conductors, one conductor for each of said columns, for sensing a change in the remanent magnetization of said films during the presence of an interrogating current; the planes of each of said films and said first and second conductors in the area of said films being substantially parallel in an overlying relationship; a flat layer of magnetic material associated with each of said films, the plane of each of which is substantially parallel to the plane of said associated film in an overlying relationship with said associated film so as to provide a low reluctance path for the external magnetic field of said film; insulative material insulating said layer of magnetic material and said first and second conductors from each other; the arrangement being such that said interrogating current when applied to any one of said first set of conductors changes the amount of remanent magnetization along said axis for each of the films associated with the first conductor so energized to provide an indication of the existence of the remanent magnetization without destruction or reversal thereof.

23. Magnetic memory apparatus comprising: a film of rectangular hysteresis loop type magnetic material exhibiting single domain properties and having a remanent magnetization vector along a given axis; first means for carrying interrogating current to cause flux to be induced in said film to rotate said vector; second means for sensing the rotation of said vector due to said flux; and an element having permeability greater than air providing a low reluctance path for the external magnetic field of said film and thereby reducing the demagnetizing fields in said film so as to increase the rotational velocity of said vector.

24. Apparatus as in claim 23 wherein said element is flat.

25. Apparatus as in claim 24 wherein said first and second means are flat.

26. Apparatus as in claim 25 wherein the planes of said film, said element, and said first and second means are parallel in an overlying relationship.

27. Apparatus as in claim 26 wherein said first and second means each has a lengthwise dimension and is oriented substantially perpendicular to each other with the crossover thereof substantially in the area of said film.

28. Apparatus as in claim 27 wherein said first and second means are between said film and said element.

29. Magnetic memory apparatus comprising: a film of rectangular hysteresis loop type magnetic material exhibiting single domain properties and having remanent magnetization along a given axis; means for carrying interrogating current to cause flux to be induced in said film; means for sensing a change in said remanent magnetization due to said flux; a metallic element providing a low reluctance path for the external magnetic field of said film thereby reducing the demagnetizing fields in said film so as to increase the single domain rotational velocity of said film.

30. Magnetic memory apparatus comprising: a film of rectangular hysteresis loop type magnetic material exhibiting single domain properties and having remanent magnetization along a given axis; means for carrying interrogating current to cause flux to be induced in said film; means for sensing a change in said remanent magnetization due to said flux; and an element having permeability greater than one providing a low reluctance path for the external magnetic field of said film thereby reducing the demagnetizing fields in said film so as to thereby increase the single domain rotational velocity of said film.

31. Magnetic memory apparatus comprising: a film of rectangular hysteresis loop type magnetic material exhibiting single domain properties and having remanent magnetization along a given axis; means for carrying interrogating current to cause flux to be induced in said film; means for sensing a change in said remanent magnetization due to said flux; and a metal layer disposed in a substantially parallel closely spaced-apart relationship to the film.

32. Magnetic core non-destructive sensing apparatus comprising a film of rectangular hysteresis loop type magnetic material exhibiting single domain properties and having remanent magnetization along a given axis, a first flat conductor in inductive relationship with said film for carrying interrogating current to cause flux to be induced in said film in a direction transverse to said axis, a second flat conductor in inductive relationship with said film for sensing the change in said remanent magnetization due to said flux, said film and said first and second conductors lying in substantially parallel planes in an overlying relationship, the arrangement being such that said interrogating current when applied at least temporarily changes the amount of remanent magnetization along said axis to provide an indication of the existence of said remanent magnetization without destruction or reversal thereof.

33. Apparatus as in claim 31 wherein said conductors each have a lengthwise dimension and are oriented substantially perpendicular to each other.

34. Apparatus as in claim 33 wherein said conductors are disposed on the same side of said film, and further including a layer of insulation between said conductors.

35. Magnetic core non-destructive sensing apparatus comprising a film of rectangular hysteresis loop type magnetic material exhibiting single domain properties and having remanent magnetization along a given axis, a conductor in inductive relationship with said film for carrying interrogating current to cause flux to be induced in said film in a direction transverse to said axis, a piece of magnetic material disposed with said conductor being between said piece and film and in the magnetic influence of said film to provide a lower-than-air reluctance return flux path for said film, and means for sensing a change in said remanent magnetization due to said flux, the arrangement being such that said interrogation current when applied at least temporarily changes the amount of remanent magnetization along said axis to provide an indication of the existence of said remanent magnetization without destruction or reversal thereof.

36. Apparatus as in claim 35 wherein said sensing means is a second conductor, said first mentioned conductor, film, piece of magnetic material, and second conductor all being respectively in different planes and overlying one another with the said first and second conductor being oriented at an angle to each other.

37. Magnetic core non-destructive sensing apparatus comprising a film of rectangular hysteresis loop type magnetic material exhibiting single domain properties and having remanent magnetization along a given axis, a conductor in inductive relationship with said film for carrying interrogating current to cause flux to be induced in said film in a direction transverse to said axis, said conductor and film being in an overlying relationship and all the outer dimensions of said conductor being at least as large as the respective dimensions of said film to cause the flux resulting from said interrogating current to be uniform throughout said film, and means for sensing a change in said remanent magnetization due to said flux, the arrangement being such that said interrogating current when applied at least temporarily changes the amount of remanent magnetization along said axis to provide an indication of the existence of said remanent magnetization without destruction or reversal thereof.

38. Magnetic memory apparatus comprising: an open flux path retentive member of a rectangular hysteresis loop type magnetic material capable of exhibiting single domain properties and having remanent magnetization along a given axis; a non-retentive magnetic member for partially closing the otherwise open flux path of said retentive member; a first conductor in conductive relationship with said retentive member for carrying interrogating current to cause flux to be induced in said retentive member for affecting said remanent magnetization; a second conductor for sensing the change in said remanent magnetization due to said flux; the arrangement being such that said interrogating current when applied at least temporarily changes the amount of remanent magnetization along said axis to provide an indication of said remanent magnetization without destruction or reversal thereof.

39. Magnetic memory apparatus comprising: an open flux path retentive member of a rectangular hysteresis loop type magnetic material capable of exhibiting single domain properties and having remanent magnetization along a given axis; a non-retentive magnetic member for at least partially closing the otherwise open flux path of said retentive member; means for carrying interrogating current to cause flux to be induced in said retentive member; and means for sensing a change in said remanent magnetization due to said flux.

40. Magnetic memory apparatus comprising: an open flux path retentive member of a rectangular hysteresis loop type magnetic material capable of exhibiting single domain properties and having remanent magnetization along a given axis; a member having a permeability greater one for at least partially closing the otherwise open flux path of said retentive member; means for carrying interrogating current to cause a flux to be induced in said retentive member; and means for sensing a change in said remanent magnetization due to said flux.

41. Magnetic memory apparatus comprising: a film of rectangular hysteresis loop type magnetic material capable of exhibiting single domain properties and having remanent magnetization along a given axis; means for carrying interrogating current to cause flux to be induced in said film; means for sensing a change in said remanent magnetization due to said flux; and a metal layer disposed in a substantially parallel close relationship to the film.

References Cited in the file of this patent

UNITED STATES PATENTS

| | | |
|---|---|---|
| 2,911,627 | Kilburn | Nov. 3, 1959 |
| 2,919,432 | Broadbent | Dec. 29, 1959 |

OTHER REFERENCES

Publication I: An article entitled, "Nondestructive Sensing of Magnetic Cores," by D. S. Buck and W. I. Frank, published January 1954, Communications and Electronics, pp. 822–830. Copy in Div. 42.

Publication II: An article entitled, "The Nondestructive Read-Out of Magnetic Cores," by A. Papoulis, published August 1954, Proceedings of the IRE, pp. 1283–1288. Copy in Div. 42.

Publication III: An article entitled, "Preparation of Thin Magnetic Films and Their Properties," by M. S. Bois, Jr., published August 1955, Journal of Applied Physics, pp. 975–980. Copy in Div. 42.

Publication IV: "A Compact Coincident-Current Memory," by Pohm and Rubens, taken from the Proceedings of Eastern Joint Computer Conference, Dec. 10–12, 1956, pp. 120–123.